(12) United States Patent
Grzic

(10) Patent No.: US 11,338,764 B2
(45) Date of Patent: May 24, 2022

(54) RESTRAINING SYSTEM FOR A SEAT BELT BUCKLE

(71) Applicant: Key Safety Systems Inc., Sterling Heignts, MI (US)

(72) Inventor: Rudi Grzic, Sterling Heights, MI (US)

(73) Assignee: Key Safety Systems Inc., Sterling Heights, MI (US)

( * ) Notice: Subject to any disclaimer, the term of this patent is extended or adjusted under 35 U.S.C. 154(b) by 189 days.

(21) Appl. No.: 16/474,302

(22) PCT Filed: Dec. 19, 2017

(86) PCT No.: PCT/US2017/067367
§ 371 (c)(1),
(2) Date: Jun. 27, 2019

(87) PCT Pub. No.: WO2018/125680
PCT Pub. Date: Jul. 5, 2018

(65) Prior Publication Data
US 2019/0337482 A1    Nov. 7, 2019

Related U.S. Application Data

(60) Provisional application No. 62/440,459, filed on Dec. 30, 2016.

(51) Int. Cl.
*B60R 22/03* (2006.01)
*B60R 22/195* (2006.01)
*B60R 22/18* (2006.01)

(52) U.S. Cl.
CPC .......... *B60R 22/03* (2013.01); *B60R 22/1952* (2013.01); *B60R 2022/1806* (2013.01)

(58) Field of Classification Search
CPC ................ B60R 22/03; B60R 22/1952; B60R 2202/1806
See application file for complete search history.

(56) References Cited

U.S. PATENT DOCUMENTS 5,261,696 A * 11/1993 Hamaue .................. B60R 22/03
280/802
5,794,876 A * 8/1998 Morizane ............ B60R 22/4633
242/374

(Continued)

FOREIGN PATENT DOCUMENTS

DE        20208808      10/2002
DE        10328560      1/2005

(Continued)

*Primary Examiner* — Barry Gooden, Jr.
(74) *Attorney, Agent, or Firm* — Meunier Carlin & Curfman LLC

(57) ABSTRACT

The present invention describes a restraining system (20) for a seat belt buckle (22) comprising: a housing (44), a motor (24), a set of gears (25, 26, 28, 30), locking mechanism (46, 48, 50), and a controlling unit (41); the restraining unit is mounted on the housing (44) for providing restraining force to the seat belt buckle (22); the restraining unit comprises at least one motor; the set of gears (25, 26, 28, 30) are mounted on the housing (44) and connected with the at least one motor (24) for providing either first direction motion or second direction motion to the seat belt buckle (22), on receiving the restraining force; the locking mechanism is mounted on the housing (44) for controlling rotation of one or more gears from the set of gears (25, 26, 28, 30); the controlling unit is operatively connected with the restraining unit and the locking mechanism, the controlling unit (41) is configured for controlling operation of the motor (24) and the locking mechanism, based on a predefined instruction.

15 Claims, 9 Drawing Sheets

(56) References Cited

U.S. PATENT DOCUMENTS

| | | | |
|---|---|---|---|
| 6,427,935 B1 * | 8/2002 | Fujii | B60R 22/44 242/390.8 |
| 6,976,707 B2 * | 12/2005 | Modinger | B60R 22/1952 280/806 |
| 7,178,835 B2 | 2/2007 | Hippel et al. | |
| 7,370,721 B2 | 5/2008 | Zelmer et al. | |
| 7,584,997 B2 * | 9/2009 | Bachmann | B60R 22/1953 180/268 |
| 7,866,703 B2 | 1/2011 | Spahn et al. | |
| 8,496,269 B2 * | 7/2013 | Holbein | B60R 22/03 280/806 |
| 8,777,268 B2 * | 7/2014 | Holbein | B60R 22/03 280/806 |
| 9,527,472 B2 * | 12/2016 | Shimazu | B60R 22/26 |
| 2003/0227166 A1 * | 12/2003 | Modinger | B60R 22/1952 280/806 |
| 2010/0001503 A1 * | 1/2010 | Tanaka | B60R 22/03 280/807 |
| 2014/0103696 A1 * | 4/2014 | Odate | B60R 22/03 297/469 |
| 2014/0191073 A1 * | 7/2014 | Odate | B60R 22/03 242/390.9 |

FOREIGN PATENT DOCUMENTS

| | | |
|---|---|---|
| DE | 102007015187 | 10/2008 |
| DE | 102013206194 | 10/2014 |

* cited by examiner

RESTRAINING SYSTEM FOR A SEAT BELT BUCKLE

BACKGROUND AND SUMMARY OF THE INVENTION

The present invention relates to safety equipment in automotive. More particularly, the present invention relates to a restraining system for a seat belt buckle capable of moving the buckle from a stored position to an extended or presented position and from the stored position to a retracted position prior to or during a crash.

Presenters and pretensioners or belt tighteners are well known features in the automotive industry for providing safety and comfort to an occupant. In the art pretensioner and belt tightener are used interchangeably. These features are generally implemented by two systems, a presenter on the buckle side and a pretensioner on the retractor or seat belt side. Since the presenter and pretensioner features are implemented separately, the systems are often complex. Additionally, buckle presenters are known in the art but the combination of a buckle presenter and pretensioner as an integrated system is not.

Further, prior art pretensioning systems are often activated by chemical/gas during crash and pre-crash conditions. These systems are complex, bulky, not user-friendly, and not reversible.

Therefore, there is a need for a system which is simple, compact, easy to use, reversible, reusable, and provides presenter and pretensioner features in one system.

The present invention describes a restraining system 20 for a seat belt buckle. The restraining system 20 of the present invention is simple in construction, easy to use, and reversible. The essential elements of the system 20 include a motor control unit 21, a motor 24, a set of gears 26, 28, 30, one or more springs 50, a solenoid 46, and a controlling unit. Additionally, the system 20 is connected to a plurality of sensors through an ECU for detecting predefined conditions such as the presence of an occupant, accident/crash conditions, etc. The plurality of sensors are installed on the seat and/or vehicle as a predefined configuration for providing signals to the ECU. The ECU in turn processes the signal and provides the processed signal to the system 20. On detection of an occupant on the seat/entering vehicle, the system 20 presents/moves the buckle 22 in a forward direction from a normal position towards the occupant to enable easy access to the buckle 22 so that the user can tie/lock the seat belt. Once the buckle is locked, it goes back to the normal position. The system 20 also presents/moves the buckle 22 in a forward direction when it identifies the conditions in which the occupant might wish to untie/unlock the buckle 22. In case of crash/possibility of crash/accident, the system 20 provides increased safety to the occupant by further restraining the belt (by moving buckle 22 in a backward direction from the normal position away from the occupant) so that the belt is tightened and the occupant is held tightly in place. The system 20 additionally includes a battery for displacing the buckle 22 in a forward direction or backward direction when there is no external power available.

The set of gears comprises a sun gear having teeth on predefined lengths on the outer circumferences of a first member and a second member, mounted on the housing and connected to a shaft of the at least one motor, optionally using a gear driver for receiving the rotational force, wherein the rotational force rotates the sun gear, a planet gear having teeth on the outer circumference, mounted on the housing and meshed with the sun gear, wherein the rotation of the sun gear rotates the planet gear, and a ring gear mounted on the housing, having teeth on at least one predefined length of at least of one of an internal circumference and centroid of the ring gear to enable meshing with the at least one of the planet gear and sun gear, wherein the rotation of the planet gear rotates the ring gear, thereby providing one of the first direction motion and second direction motion to the seat belt buckle, through the cable.

Each of the sun gear, the planet gear, and the ring gear having predefined diameters to provide 6:1 gear drive ratio during the first direction motion of the seat belt buckle and 1:1 gear drive ratio during the second direction motion of the seat belt buckle.

The ring gear has a plurality of grooves on at least one predefined length of outer circumference to enable braking using at least one engagement member.

A first end of the cable is connected to a predefined point on the ring gear and a second end is connected with the seat belt buckle.

The system comprises one or more cable guide tubes for channelizing the cable which is connected between the ring gear and the seat belt buckle. According to one embodiment, the cable is made of steel and is flexible in nature.

The locking mechanism comprises at least one spring mounted on the housing, at least one engagement member connected to the at least one spring at one end, supported by a housing on the other end, and at least one solenoid connected with an engagement member for controlling rotation of the ring gear on receiving a control signal from the controlling unit.

The controlling unit or control or power unit is an embedded system comprising one or more instructions for controlling operation of the at least one of the restraining unit and the locking mechanism as well as a separate battery as needed.

The system further comprises one or more sensors to count the number of rotations of the at least one motor or alternately movement of the ring gear.

The present invention describes a seat belt buckle controlling assembly for moving the buckle from a rest position to a presenting position to a rewound or pretension position comprising a housing, a motor control unit mounted on the housing for providing restraining force to a seat belt buckle, the restraining unit comprising at least one motor, a set of gears mounted on the housing and connected with the at least one motor for providing motion to the seat belt buckle via a cable in one of a forward direction to the presenting position and backward direction to the rewound or pretensioning position, a locking mechanism mounted on the housing for controlling rotation of one or more gears from the set of gears or the cable, and a controlling unit operatively connected to the restraining unit and the locking mechanism, the controlling unit configured for synchronizing and controlling operation of the at least one motor and the locking mechanism, based on a predefined instruction.

A further embodiment of the present invention describes a restraining system for a seat belt buckle. The system comprises a housing; a restraining unit mounted on the housing for providing restraining force to the seat belt buckle, the restraining unit comprising at least one motor, a set of gears mounted on the housing and connected with the at least one motor for providing one of a forward motion and backward motion to the seat belt buckle, on receiving the restraining force, through a cable, and a controlling unit

DETAILED DESCRIPTION OF THE DRAWINGS

Figure 1A:
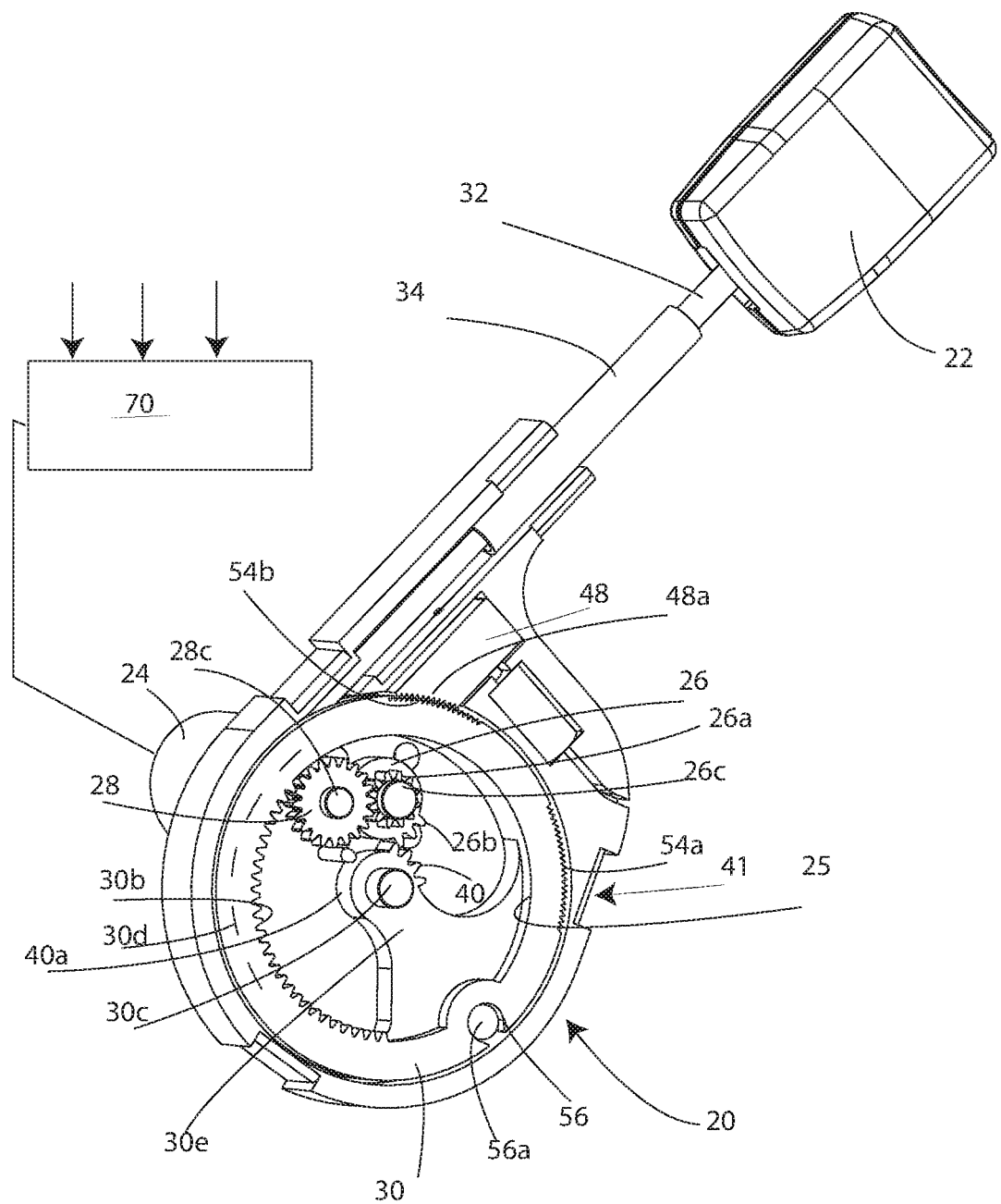
FIG. 1a diagrammatically illustrates a restraining system for a seat belt buckle, according to an embodiment of the present invention.
Figure 1B:
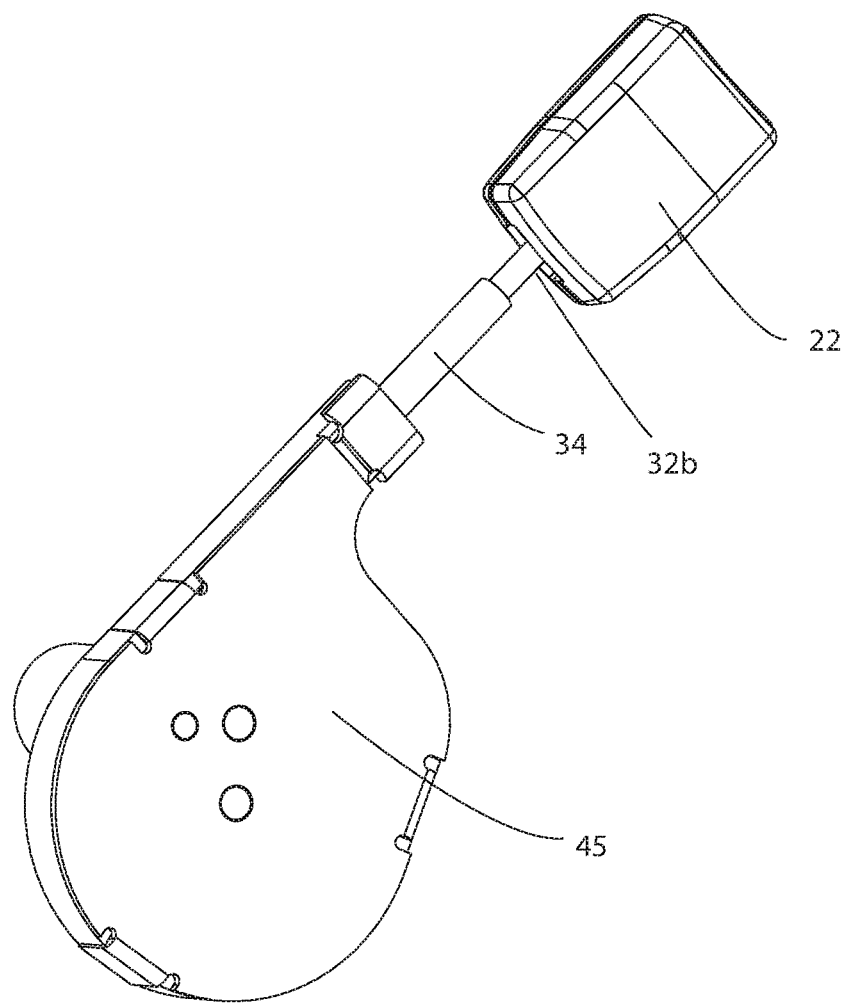
FIG. 1b shows another side of the housing of the present invention.
Figure 5:
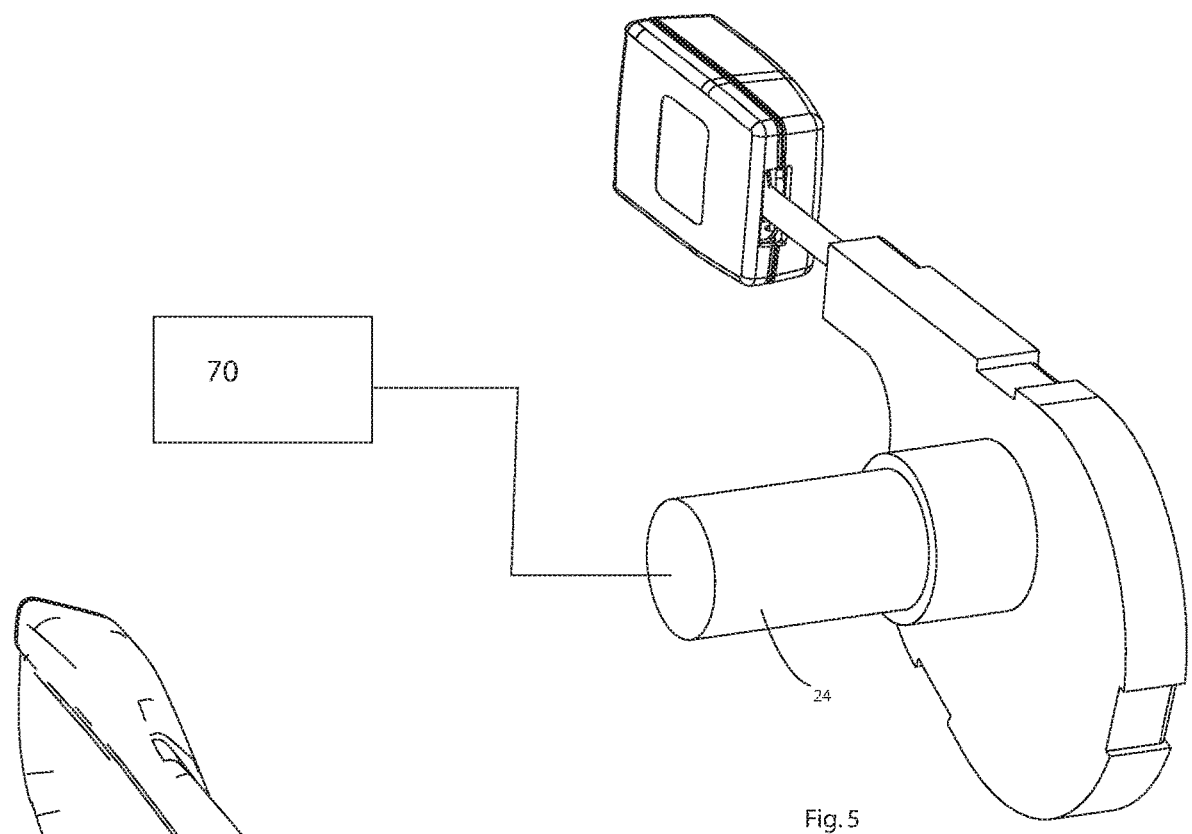
FIG. 5 diagrammatically illustrates a prospective view of a restraining system for a seat belt buckle, according to an embodiment of the present invention.
Figure 9:
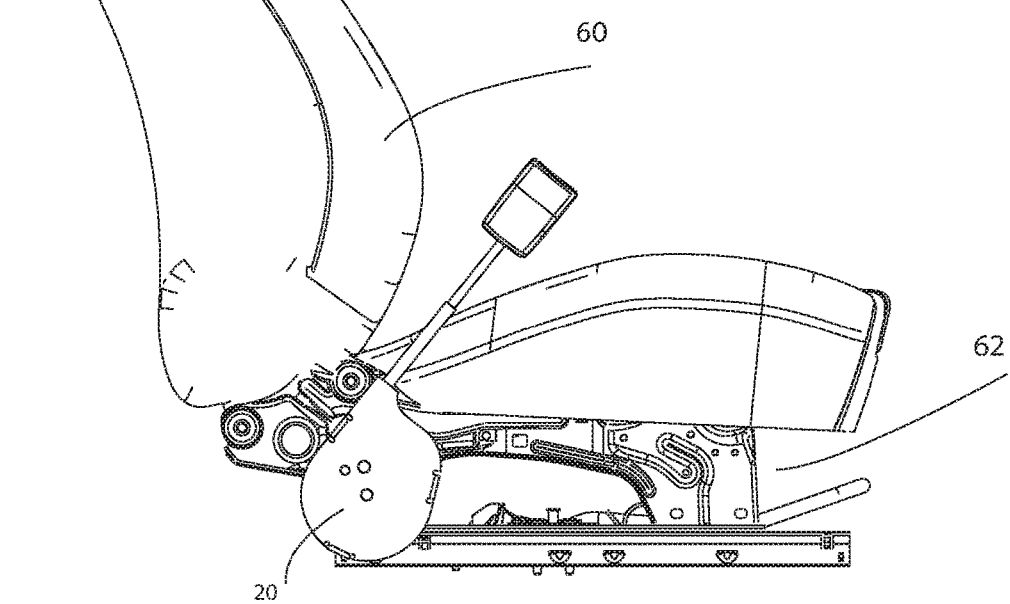
FIG. 9 illustrates a vehicle seat 60 equipped with a restraining system 20 for a seat belt buckle 22, according to an embodiment of the present invention.
Figure 6:
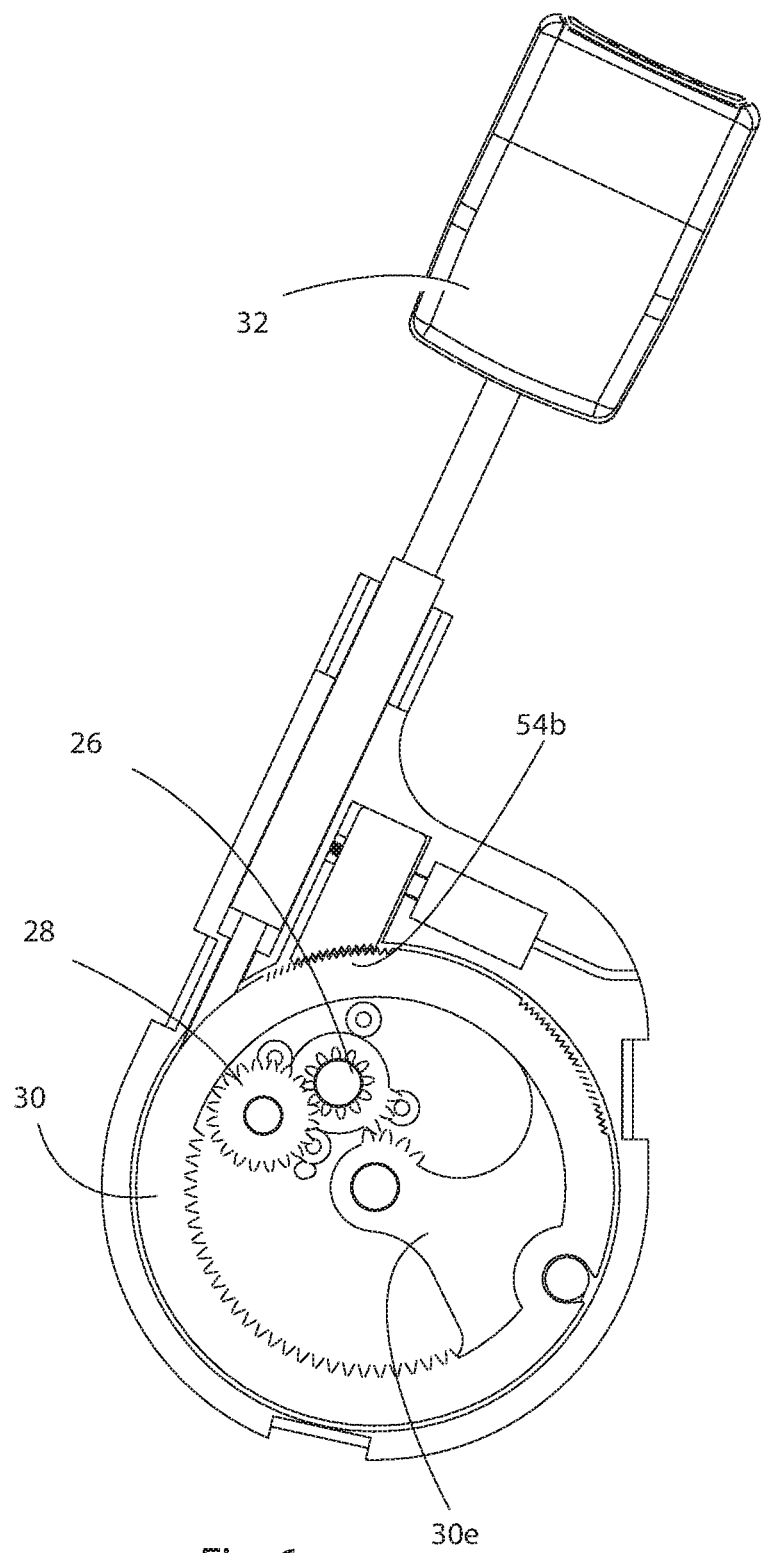
FIG. 6 diagrammatically illustrates a restraining system in which the seat belt is in a normal position, according to an embodiment of the present invention.
Figure 7:
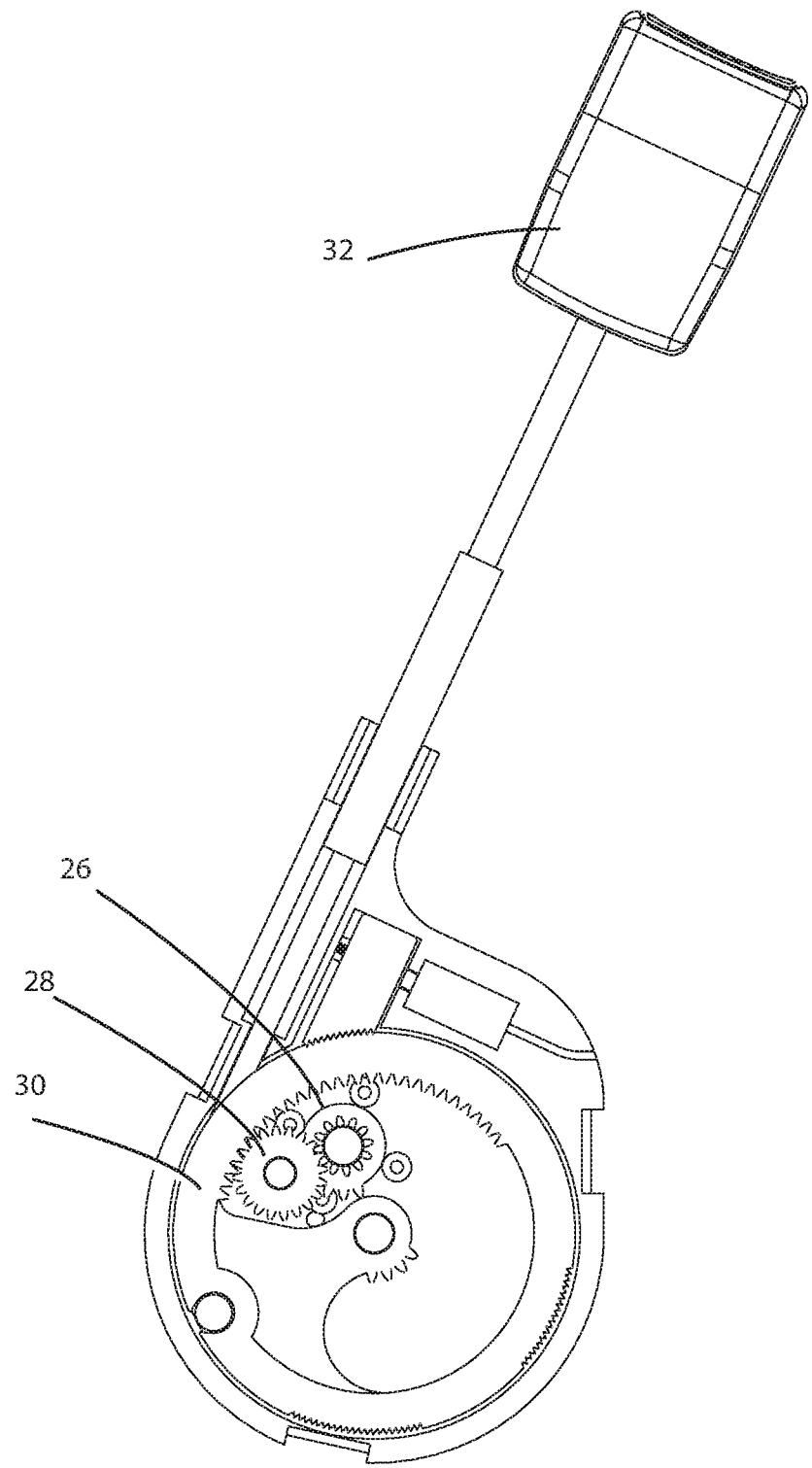
FIG. 7 diagrammatically illustrates a restraining system in which the seat belt is at a first position/forward position, according to an embodiment of the present invention.
Figure 8:
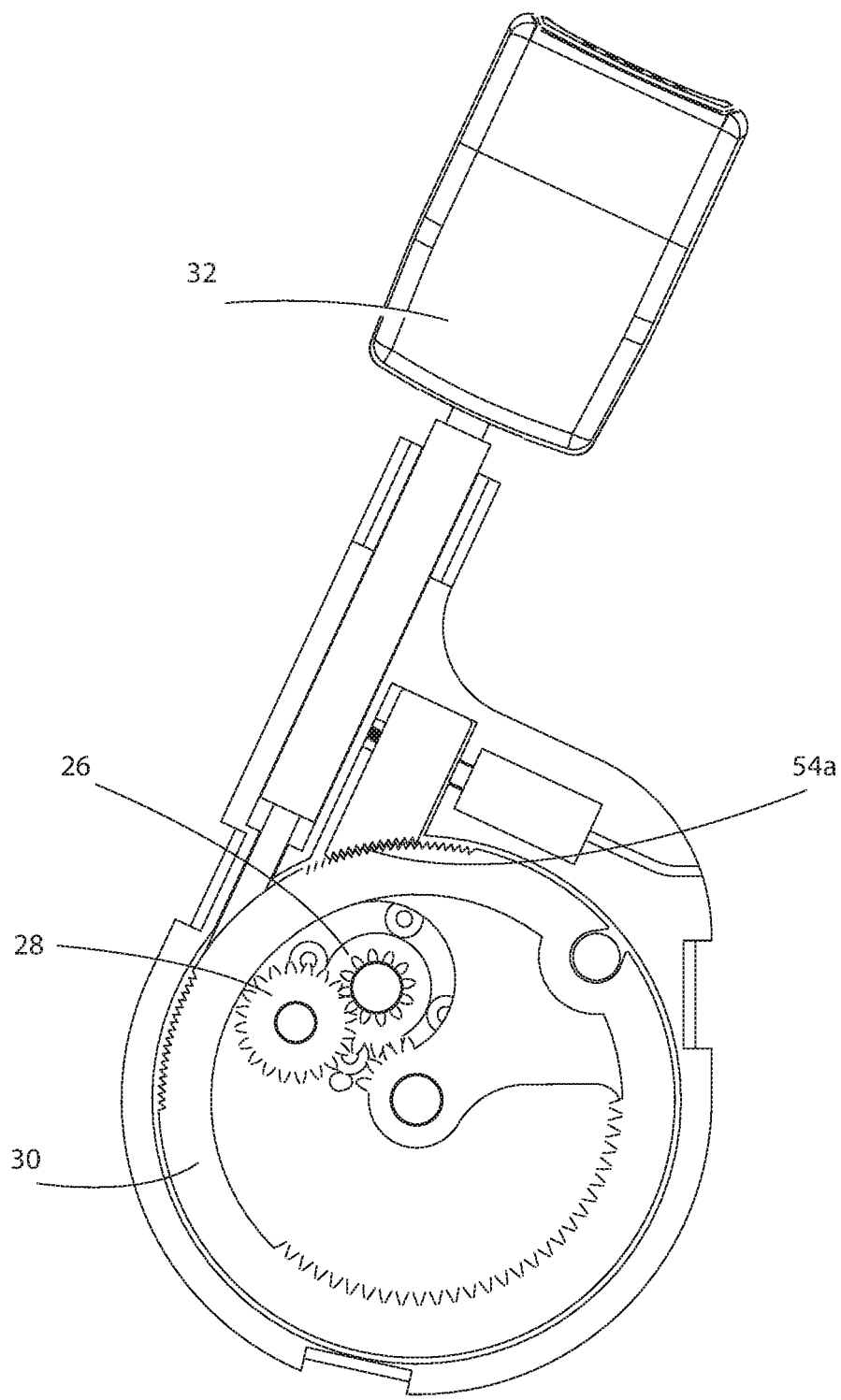
FIG. 8 diagrammatically illustrates a restraining system in which the seat belt is at a second position/backward position, according to an embodiment of the present invention.

FIG. 1a diagrammatically illustrates a restraining system 20 for a seat belt buckle 22, according to an embodiment of the present invention. The restraining system 20 comprises a motion control unit 41 including a housing, a set of gears 25, 26, 28, 30 (also referred to as a gear set), a motor 24, a locking mechanism, and a control unit and power source 70 as also shown in FIG. 5. The housing additionally comprises a cover 45 shown in FIG. 1b to protect those components within the housing including the above items as well as a cable guiding and telescoping tube 34, 34a and cable. The motor 24 is mounted on the housing and upon receiving a signal from the control and power unit 70 in combination with the gear set controllably and forcibly moves the cable and buckle from a stowed or normal position adjacent a side of a seated occupant to a forward or extended presented position which enables the occupant to more easily locate the buckle and insert a locking tongue into the forwardly positioned buckle. The buckle is also quickly movable from the normal position to a reverse, pretensioning or restraining position where an associated seat belt will be tightly drawn about the occupant just prior to a crash. Thereafter the buckle can be returned to the normal position. In this belt tightened or pretensioned position the restraining system provides a restraining force to the seat belt buckle 22 to oppose the forward motion of the occupant with the seat belt tongue lockingly accepted in the buckle. The three main positions of the seat belt restraint system 20 are the normal or stowed position as shown in FIG. 6, a first or extended or presented position as shown in FIG. 7, and a second or retracted or pre-crash position as shown in FIG. 8. FIG. 9 illustrates a vehicle seat 60 equipped with a restraining system 20 for a seat belt buckle 22, according to an embodiment of the present invention.

Figure 2:
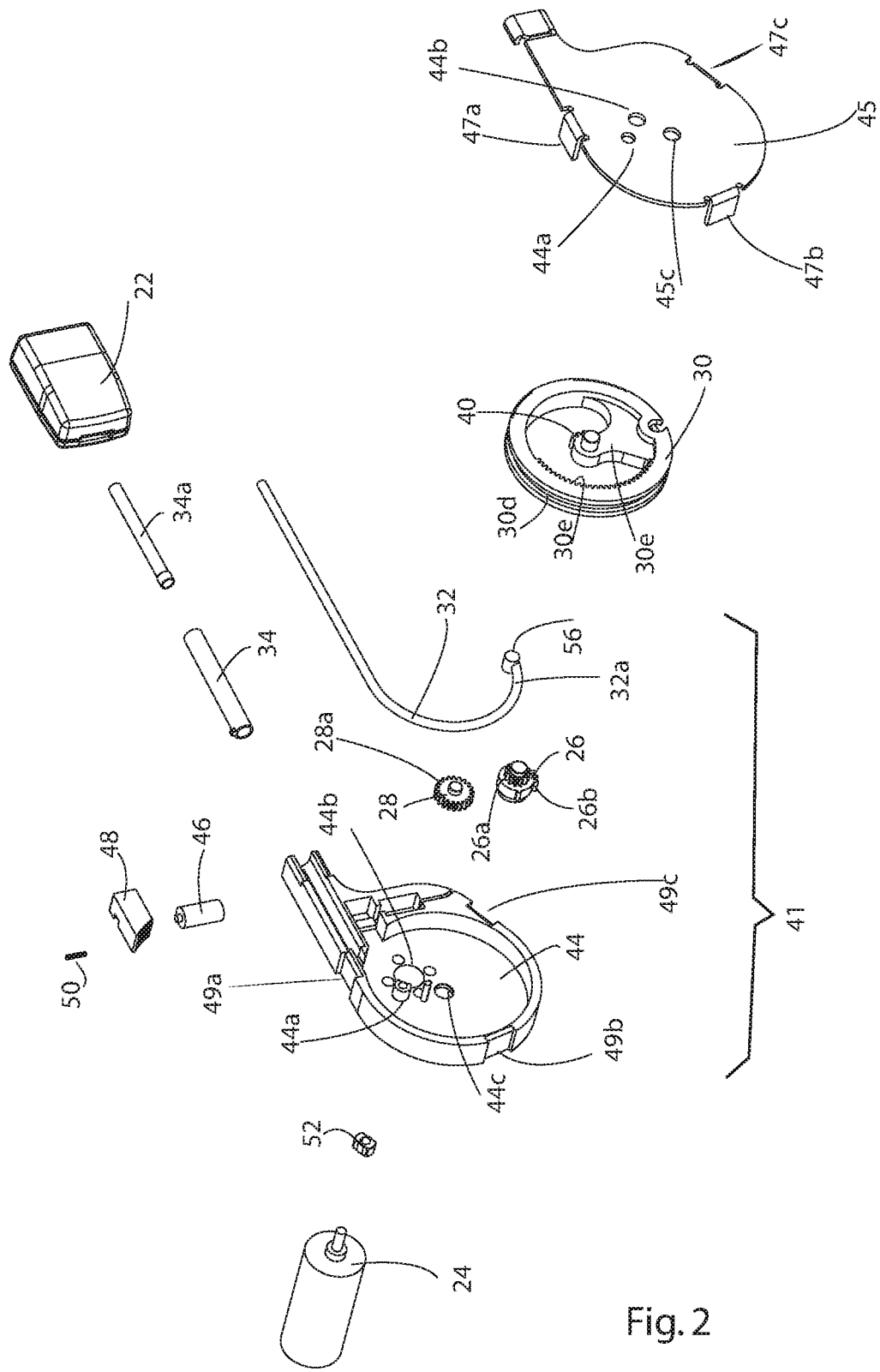
FIG. 2 diagrammatically illustrates an exploded view of a restraining system for a seat belt buckle, according to an embodiment of the present invention.

FIG. 2 diagrammatically illustrates an exploded view of the restraining system 20 for a seat belt buckle 22. The exploded view of the system 20 shows a motion control unit 41 with housing 44, a motor 24, the set of gears comprising a sun gear 26, a planet gear 28, a ring gear 30, a cable 32, and at least one cable guiding tubes 34, 34a. The housing 44 includes a first set of openings 44a, 44b and 44c to rotationally receive a center pin 26c, 28c and 30c of each of the sun gear, the planet gear and a center arm 30e of the ring gear. The housing cover 45 includes a complementary set of openings 44, 44b and 45c to rotationally support the other ends of the center pins of the sun gear, planet gear and center arm of the ring gear. The cover also includes snaps 47a, 47b and 47c each of which is received upon a groove 49a-c on the housing 44. The motor 24 can be a single speed motor or able to be moved at varying speeds. Additionally, the single motor can be replaced by a set of two motors 24, a first motor for moving the gears in a first direction and a second motor for moving the gears in a second direction motion. The sun gear shown in these figures includes a first gear with a set of gear teeth 26a and a second gear with a segmented, shortened or partial set of gear teeth 26b situated above gear teeth 26a. This set of gear teeth is configured to engage with teeth 40 on the center arm of the ring gear 30. A first end 32a of the cable 32, which can be formed into or connected to a cylindrical pin 56a, is connected to a predefined region 56 formed as a circular slot on the gear 30 and a second end 32b is connected with the seat belt buckle 22. The cable 32 is placed in such a way in the groove 30d of the ring gear 30 that the rotation of gear 30 moves the buckle 22 either in the forward position or the backward position.

Figure 3:
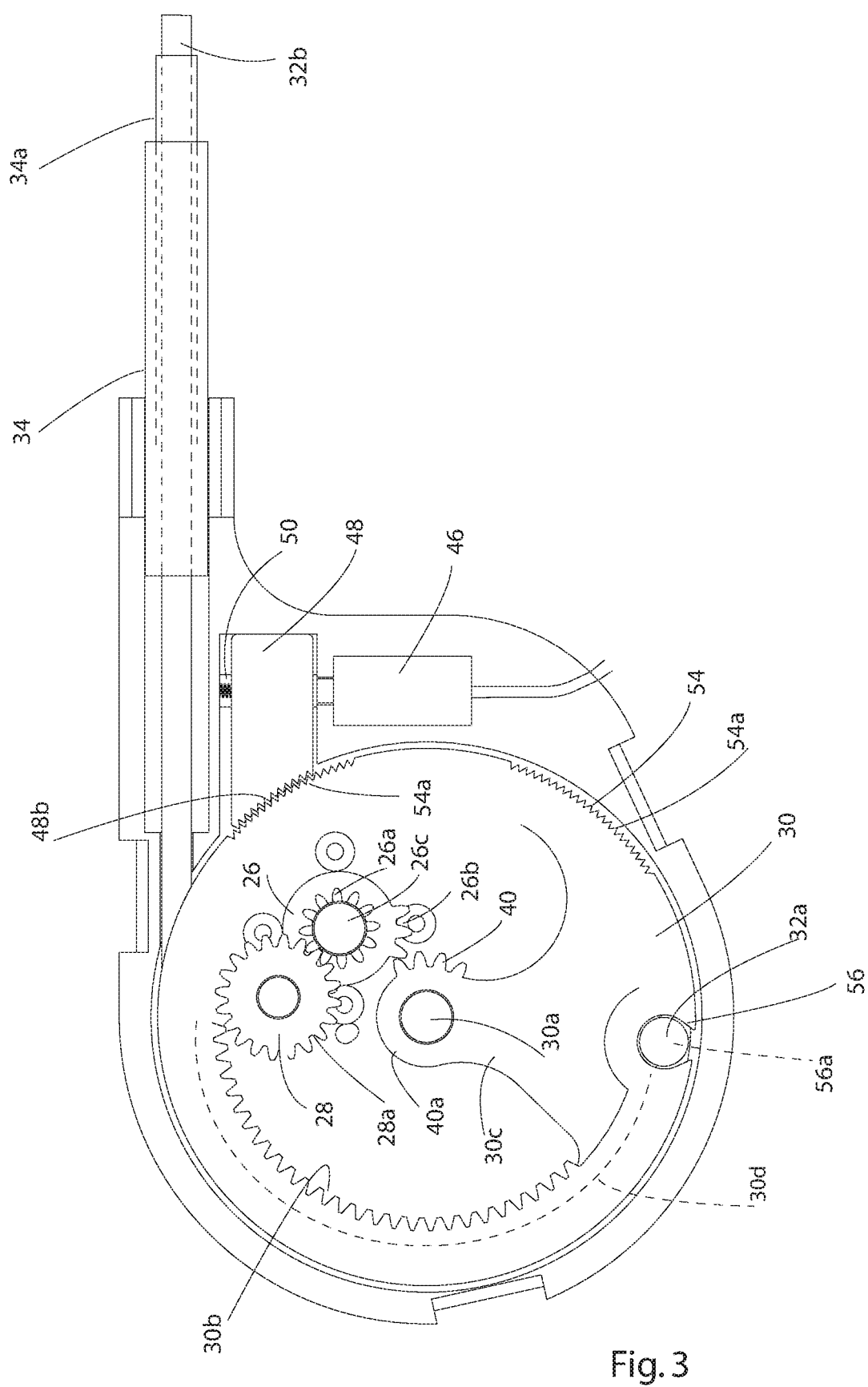
FIG. 3 diagrammatically illustrates a sectional view of a restraining system for a seat belt buckle, according to an embodiment of the present invention.

As shown in FIG. 3 the motor control unit 41 comprises at least one motor 24 and a control unit and/or power source 70. The power source also includes a feature to run the motor 24, when there is no external power source or external power supply is disconnected or disturbed.

The locking mechanism 46, 48, 50 is mounted on the housing in a contacting relation with one or more gears from the set of gears 26, 28, 30. As mentioned, the system 20 further comprises one or more sensors (see arrows on block 70) to count the number of rotations of the at least one motor 24 and stop the at least one motor 24 based on a predefined number of turns for either forward motion or backward motion. This predefined number can vary for forward or backward. The system 20 is operatively connected to one or more sensors to sense door status such as open or closed, and buckle status such as locked, unlocked, or position of the buckle.

The control and power unit 70 is configured to synchronize the operation of the motor 24 and the locking mechanism 46, 48, 50 before controlling the operation of one motor 24 and the locking mechanism 46, 48, 50, based on predefined instructions. The predefined instructions and sensor inputs can be defined by the manufacturer during a manufacturing stage. In another embodiment, the predefined instructions are defined by the user based on manual customization. The controlling unit can be part of the restraining system 20 or can be external to the restraining system 20 or can be in an electronic control unit (ECU) of a vehicle.

The restraining system 20 detects an occupant on the seat on receiving one or more signals from one or more sensors (the arrows by controller 70). The control and power unit on detecting the occupant on the seat/occupant entering the vehicle by various known methods sends a signal to unlock the one or more gears and runs the motor 24 in a counter-clockwise direction. FIG. 3 shows the initial alignment of the partial gears. In this situation with the buckle in its normal position, one tooth of teeth 40 is in engagement with one tooth of teeth 26*b*. To move the cable and buckle to the presented position, the rotation of motor 24 rotates the sun gear 26 which is connected to the shaft of the motor 24, in a counterclockwise direction. The teeth of planet gear 28 are meshed with the teeth 26*a* of sun gear 26 in such a way that the rotation of the sun gear 26 rotates the planet gear 28 in a clockwise direction. The ring gear 30 has a limited number teeth 30*b* on the inner circumference teeth of the ring gear. This limited number of teeth 30*b* extends from the arm 30*e* to the planet gear 28. The ring gear 30 is meshed with planet gear 28. The rotation of the planet gear 28 rotates the ring gear 30 in a clockwise direction to extend the cable 32. The cable 32 which is connected with the ring gear 30 and the buckle 22 moves the buckle 22 in the forward or buckle presenting direction. Once the buckle 22 reaches to a predefined forward position, the control and power unit sends a control signal to stop the motor and to the locking mechanism to activate the solenoid 46. The solenoid 46 with the help of the engagement member 48 and spring 52 holds the rotation of the ring gear 30 in its current position and in turn holds the forward motion of the cable 32. The locking mechanism includes, but is not limited to, at least one return spring 50 mounted on the housing 44, at least one engagement member 48 connected to spring 50 at one end and urging the engagement member toward the outer periphery of the ring gear. The solenoid 46 is connected with an engagement member 48 which urges the engagement member away from the ring gear. In one embodiment the engagement member 48 includes teeth 48*a* on a lower surface 48*b* to engage with the teeth 54*a* or teeth 54*b* on the ring gear. In another embodiment the lower surface can include a high friction coating to engage with the outer surface of the ring gear 30. To achieve movement of the buckle the gear ratio of the ring gear to planet gear to sun gear is preferably in the range of 1:1 enabling the buckle to move at a controlled by slow speed. This overall gear ratio can be changed to insure the proper speed of the cable and buckle.

The engagement member is freed from this locking position to enable the cable to be retracted to its rest, normal or stowed position. This forward position of the buckle 22 enables the occupant to have easy access to the buckle 22 for tying/locking with the seat belt.

With the gears in the rest portion as shown in FIGS. 1*a* and 3 if the motor is rotated in a clockwise position in response to crash or anticipated crash signals the partial set of gear teeth 26*b* will engage the partial set of teeth 40*a* causing the ring gear to rotate in a counterclockwise direction to begin to pull the buckle to its pretensioned position as shown in FIG. 8. As can be appreciated the planet gear is effectively eliminated from this action. As can be seen only a small rotational movement of the sun gear causes a dramatic rotation of the ring gear 30. The distance the buckle is moved is in proportion to the gear ratio between the sun and ring gear and the dimension of the arm 30*e* of the ring gear.

The sun gear 26, the planet gear 28, and the ring gear 30, for example, can use predefined diameters to provide 6:1 to 8:1 gear drive ratio during movement to the presented position in a slow manner and 1:1 to 1.5 gear drive ratio during when moving the buckle to the pretensioned positioned.

The ring gear 30 additionally includes a first and second plurality of grooves 54*a* and 54*b* on two predefined lengths of outer circumference 54 to enable braking or locking of the ring gear using at least one engagement member 48 which has gear teeth 48*a*. The engagement member will lock with teeth 54*b* when in the presented position as also shown in FIG. 7 and with teeth 54*a* when in the pretensioned positioned, shown in FIG. 8.

Figure 4:
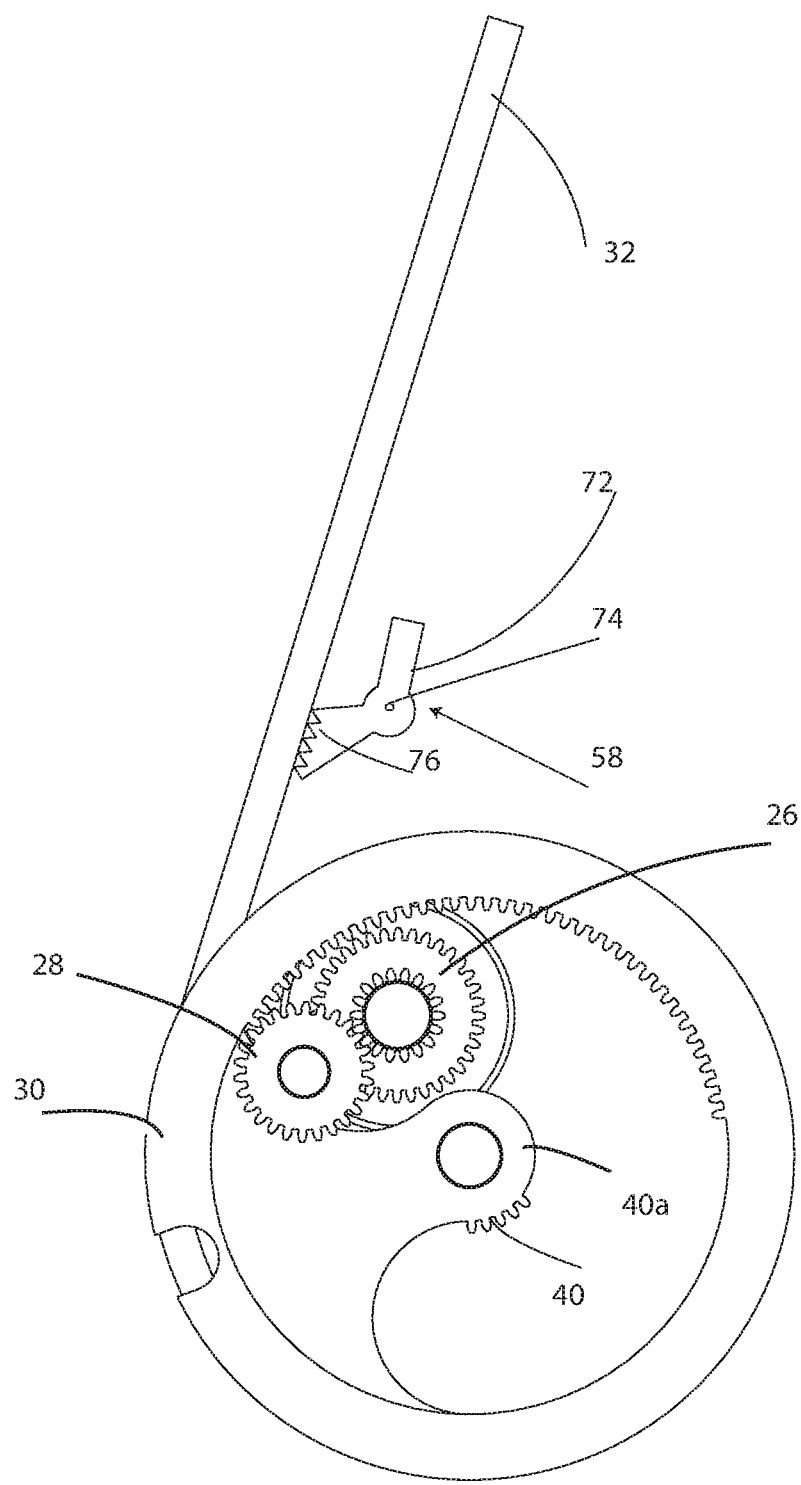
FIG. 4 diagrammatically illustrates a restraining system for a seat belt buckle in which a locking mechanism is connected to a cable, according to an exemplary embodiment of the present invention.

Another version, as shown in FIG. 4, of the locking mechanism includes a rotatable pawl 72; the pawl is rotatable about an axis 74 and includes locking teeth 76 positioned to engage a portion of the cable 32. The pawl can be rotated by a motor or moved by a solenoid into and out of its locking position. Locking of the cable also prevents the set of gears from rotating.

As the gears move to the various positions the motor 24 will be stopped at the appropriate time upon counting a predefined number of turns in order to control the motion of the seat belt buckle 22 and gears. The predefined number of turns varies for clockwise rotation and for counterclockwise rotation.

The controlling unit 70 can be an embedded system comprising one or more instructions for controlling operation of the at least one of the restraining unit 24 and the locking mechanism.

A prospective view of the motor is shown in FIG. 5. FIG. 9 shows the retraining system 20 relative to a vehicle seat 60 and frame 62.

All equivalent relationships to those illustrated in the drawings and described in the application are intended to be encompassed by the present invention. The examples used to illustrate the embodiments of the present invention, in no way limit the applicability of the present invention to them. It is to be noted that those with ordinary skill in the art will appreciate that various modifications and alternatives to the details could be developed in the light of the overall teachings of the disclosure, without departing from the scope of the invention.

The invention claimed is:

1. A restraining system configured to move a seat belt buckle between a restraint position and a presented position, the system comprising:
   a control motion unit comprising
   a housing; a cable extending from the housing and connected to the buckle,
   at least one motor;
   a set of gears mounted on the housing and connected with the at least one motor, a locking mechanism that locks the set of gears from moving; and
   a controlling unit for controlling operation of the at least one motor and the locking mechanism, based on a predefined instruction;
   wherein the locking mechanism comprises:
   a spring mounted on the housing;
   an engagement member connected to the spring, the spring biasing the engagement member toward at least one gear of the set of gears; and
   at least one solenoid connected with the engagement member;
   wherein upon receiving a control signal from the controlling unit, the solenoid is activated, linearly moving the engagement member to engage the at least one gear of the set of gears to lock rotation of the at least one gear of the set of gears.

2. The system of claim 1, wherein the cable is made of steel and is flexible in nature.

3. The system of claim 1, wherein the controlling unit is an embedded system that comprises one or more instructions for controlling operation of the at least one of the restraining unit and the locking mechanism.

4. The system of claim 1, further comprising one or more sensors to count the number of rotations of the at least one motor.

5. The system of claim 1, wherein the set of gears comprises:
- a sun gear having teeth on predefined lengths on the outer circumferences of a first member and a second member, mounted on the housing and connected to a shaft of the at least one motor using a gear driver for receiving the rotational force, wherein the rotational force rotates the sun gear in first and second directions;
- a planet gear having teeth on an outer circumference, mounted on the housing and meshed with the first member of the sun gear, wherein the rotation of sun gear in the first direction rotates the planet gear; and
- a ring gear mounted on the housing, having teeth on at least one predefined length of at least one of an internal circumference to enable meshing with the at least one of the planet gear and center gear with gear teeth to enable meshing with the second member of sun gear when the sun gears rotates in a defined direction,
- wherein the rotation of the planet gear rotates the ring gear, thereby providing one of the first direction motion and second direction motion to the seat belt buckle, through the cable and wherein when the second member of the sun gear contacts the center gear of the ring the buckle is capable of moving in the second direction at an advanced rate.

6. The system of claim 5, wherein each of the sun gear, the planet gear, and the ring gear have predefined diameters to provide 6:1 gear drive ratio during the first direction motion of the seat belt buckle and 1:1 gear drive ratio during the second direction motion of the seat belt buckle with the second member in contact with the center gear.

7. The system of claim 5, wherein the ring gear has a plurality of grooves on at least one predefined length of outer circumference, wherein the at least one gear of the set of gears locked by the engagement member is the ring gear.

8. The system of claim 5, wherein a first end of the cable is connected to a predefined point on the ring gear and a second end is connected with the seat belt buckle.

9. The system of claim 5, further comprising one or more cable guide tubes for channelizing the cable which is connected between the ring gear and the seat belt buckle.

10. A restraining mechanism for a buckle assembly comprising:
- a restraining unit and a locking mechanism mounted on a housing for controlling positioning of a seat belt buckle, in one of a forward position, backward position, and normal position, on receiving a control signal from a controlling unit, and
- a motor, a gear connected to the motor, and a cable,
- wherein the locking mechanism comprises:
- a spring mounted on the housing;
- an engagement member connected to the spring, the spring biasing the engagement member toward the gear; and
- at least one solenoid connected with the engagement member;
- wherein upon receiving the control signal from the controlling unit, the solenoid is activated, linearly moving the engagement member to engage the gear to lock rotation of the gear.

11. The assembly of claim 10, wherein the controlling unit is an embedded system comprising one or more instructions for controlling an operation of at least one of the restraining unit and the locking mechanism.

12. The assembly of claim 10, further comprising one or more sensors to count a number of rotations of the motor.

13. The assembly of claim 10, further comprising one or more cable guide tubes for channelizing the cable which is connected between the gear and the seat belt buckle.

14. The assembly of claim 10, wherein a first end of the cable is connected to a predefined point on the gear and a second end is connected with the seat belt buckle.

15. The assembly of claim 14, wherein the cable is made of steel and is flexible in nature.

* * * * *